(12) United States Patent
Nakashima et al.

(10) Patent No.: US 9,499,256 B2
(45) Date of Patent: Nov. 22, 2016

(54) LANDING GEAR STORAGE COMPARTMENT OF AIRCRAFT, AND AIRCRAFT

(71) Applicant: Mitsubishi Aircraft Corporation, Aichi (JP)

(72) Inventors: Keiji Nakashima, Aichi (JP); Shinichi Hada, Aichi (JP); Takashi Sugimoto, Aichi (JP)

(73) Assignee: MITSUBISHI AIRCRAFT CORPORATION, Aichi (JP)

(*) Notice: Subject to any disclaimer, the term of this patent is extended or adjusted under 35 U.S.C. 154(b) by 0 days.

(21) Appl. No.: 14/322,217

(22) Filed: Jul. 2, 2014

(65) Prior Publication Data
US 2015/0041586 A1 Feb. 12, 2015

(30) Foreign Application Priority Data
Aug. 8, 2013 (JP) .................................. 2013-165249

(51) Int. Cl.
*B64C 25/00* (2006.01)
*B64C 25/12* (2006.01)

(52) U.S. Cl.
CPC ............ *B64C 25/001* (2013.01); *B64C 25/12* (2013.01); *B64C 2025/125* (2013.01)

(58) Field of Classification Search
CPC ....... B64C 25/00; B64C 25/02; B64C 25/60; B64C 2025/006; B64C 25/44; B64C 25/52
USPC ............ 244/100 R, 102 R, 119, 117 R, 120, 244/129.1, 129.4, 50
See application file for complete search history.

(56) References Cited

U.S. PATENT DOCUMENTS

| | | | | |
|---|---|---|---|---|
| 2,483,027 A | * | 9/1949 | Hill et al. ................. | 244/102 R |
| 3,506,222 A | * | 4/1970 | Anderson ..................... | 244/101 |
| 3,900,988 A | * | 8/1975 | Garabello ............. | A63H 27/02 |
| | | | | 244/102 R |
| 3,991,957 A | * | 11/1976 | Neumann ................. | 244/102 R |
| 5,000,400 A | * | 3/1991 | Stuhr ........................ | 244/102 R |
| 5,100,083 A | * | 3/1992 | Large et al. ............ | 244/102 SS |
| 5,692,703 A | * | 12/1997 | Murphy et al. .......... | 244/102 R |
| 6,651,931 B1 | * | 11/2003 | Fox et al. ................. | 244/104 R |
| 7,216,830 B2 | * | 5/2007 | Quayle et al. ................. | 244/15 |
| 7,243,880 B2 | * | 7/2007 | White et al. ............. | 244/129.5 |
| 7,287,726 B2 | * | 10/2007 | Briancourt ................ | 244/102 R |
| 7,641,146 B2 | * | 1/2010 | Wood et al. ................. | 244/119 |
| 8,109,465 B1 | * | 2/2012 | Heer ......................... | 244/102 R |
| 8,746,616 B2 | * | 6/2014 | Barmichev et al. ...... | 244/102 R |

(Continued)

FOREIGN PATENT DOCUMENTS

JP 2004-050856 A 2/2004

*Primary Examiner* — Valentina Xavier
*Assistant Examiner* — Assres H Woldemaryam
(74) *Attorney, Agent, or Firm* — Pearne & Gordon LLP (57) ABSTRACT

To provide a landing gear storage compartment of an aircraft which can protect accessories installed around a landing gear by blocking jet blast and dust etc. while suppressing the weight and the cost. A landing gear storage compartment 3 of an aircraft 1 includes: a storage bay 31 that stores a landing gear 2 for use in takeoff and landing; and a shielding wall 32, inside of which a wheel assembly 21 of the landing gear 2 stored in the storage bay 31 is arranged, and whose lower side, through which the wheel assembly enters and exits, and whose upper side are opened. An upper opening 32C of the shielding wall 32 is covered with a partition wall 13 that separates a cabin 12 located above the storage bay 31, and the storage bay 31.

6 Claims, 6 Drawing Sheets

(56) References Cited

U.S. PATENT DOCUMENTS

| | | | |
|---|---|---|---|
| 2007/0095977 A1* | 5/2007 | Gabrys | B64C 25/32 244/103 R |
| 2008/0179457 A1* | 7/2008 | Guering | B64D 11/00 244/118.5 |
| 2009/0159743 A1* | 6/2009 | Guering et al. | 244/102 R |
| 2010/0001129 A1* | 1/2010 | Guering | 244/102 R |
| 2010/0072319 A1* | 3/2010 | De Ruffray et al. | 244/102 SS |
| 2012/0153078 A1* | 6/2012 | Loupias et al. | 244/102 R |
| 2012/0193470 A1* | 8/2012 | Kosheleff | 244/102 R |
| 2014/0175223 A1* | 6/2014 | Durand et al. | 244/119 |

* cited by examiner

LANDING GEAR STORAGE COMPARTMENT OF AIRCRAFT, AND AIRCRAFT

BACKGROUND OF THE INVENTION

1. Field of the Invention

The present invention relates to a landing gear storage compartment which stores a landing gear of an aircraft, and an aircraft.

2. Description of the Related Art

A main landing gear used in takeoff and landing of aircraft is stored in a main landing gear storage compartment during a flight (Japanese Patent Laid-Open No. 2004-50856).

The main landing gear storage compartment is provided in a fuselage in many cases. The main landing gear storage compartment stores the entire main landing gear including a wheel assembly and a strut. Various accessories are installed around the main landing gear.

When the main landing gear is stored, air inside a tire of the wheel assembly may be jetted through a fine crack or the like in the tire to cause jet blast.

During taxiing, foreign matter, such as dust, kicked up by the tire also enters the inside of the main landing gear storage compartment.

In some cases, a shield that accommodates the wheel assembly therein is provided so as to block the jet blast and the dust etc., and thereby protect the accessories installed around the main landing gear. The shield surrounds the wheel assembly from the lateral and upper sides except for a lower opening, through which the wheel assembly enters and exits when the main landing gear is raised and lowered, and a lateral opening, through which the strut is passed when the wheel assembly is accommodated.

Because of the form surrounding the wheel assembly as described above, the shield has a large weight, and a high material cost.

Thus, an object of the present invention is to provide a landing gear storage compartment of an aircraft which can protect accessories installed around a landing gear by blocking jet blast and dust etc. while suppressing the weight and the cost, and an aircraft.

SUMMARY OF THE INVENTION

A landing gear storage compartment of an aircraft according to the present invention includes: a storage bay that stores a landing gear for use in takeoff and landing; and a wall body, inside of which a wheel assembly of the landing gear stored in the storage bay is arranged, and whose lower side, through which the wheel assembly enters and exits, and whose upper side are opened.

In the present invention, the upper opening of the wall body is covered with a member that separates an upper zone located above the storage bay, and the storage bay.

In the present invention, a tire of the wheel assembly is surrounded by the wall body provided in the landing gear storage compartment, and the member that separates the storage bay and the upper zone (referred to as partition member below). Therefore, jet blast generated in the tire of the wheel assembly is blocked by the wall body and the partition member, and the pressure of the jet blast does not affect accessories around the wall body. Thus, the accessories are protected without being damaged.

In a similar manner to the jet blast, dust etc. scattering from the wheel assembly also remains within a space surrounded by the wall body and the partition member, and does not scatter to the outside of the wall body and the partition member. Therefore, the dust etc. can be prevented from contaminating the accessories or affecting the operations thereof.

Here, the partition member that covers the upper opening of the wall body functions as a wall that separates the storage bay and the upper zone, and also as a lid portion of the wall body. Therefore, the weight and the material cost of the shield that surrounds the wheel assembly and blocks the jet blast and the dust can be suppressed as compared to a case in which a lid portion is provided at the wall body separately from the partition member.

That is, in accordance with the present invention, it is possible to protect the accessories installed within the storage bay from the jet blast and the dust etc. while achieving a weight reduction, which is strongly demanded in the aircraft, and achieving a cost decrease.

The wall body of the present invention may be formed in a cylindrical shape. A strut opening, through which a strut that supports the wheel assembly is passed, may be formed in the wall body.

The circular-cylindrical wall body may be formed from a metal material by roll forming or stretch forming.

Since the roll forming and the stretch forming are more excellent in productivity than deep drawing, cutting or casting, the manufacturing cost can be suppressed.

In the landing gear storage compartment of an aircraft according to the present invention, the wall body may be fixed to the partition member, and may be fixed to a fairing that is located around the lower opening of the wall body and reduces aerodynamic drag of an airframe, to thereby support the fairing.

When the wall body also functions to support the fairing as described above, a support member that supports the fairing on a skin or the like can be simplified.

The partition member is more preferably a structural member such as a pressure-resistant partition wall.

In the landing gear storage compartment of an aircraft according to the present invention, the wall body preferably includes a plurality of panels that are detachably coupled to each other.

Accordingly, maintenance of the accessories can be easily performed from inside the wall body by removing only one panel facing the accessories as an object of maintenance.

An aircraft according to the present invention includes the above landing gear storage compartment, thereby obtaining the above effects.

The present invention can provide the landing gear storage compartment of an aircraft which can protect the accessories installed within the storage bay by blocking the jet blast and the dust etc. while suppressing the weight and the cost, and the aircraft including the landing gear storage compartment.

DETAILED DESCRIPTION OF THE PREFERRED EMBODIMENTS

In the following, an embodiment of the present invention is described with reference to the accompanying drawings.

Figure 1:
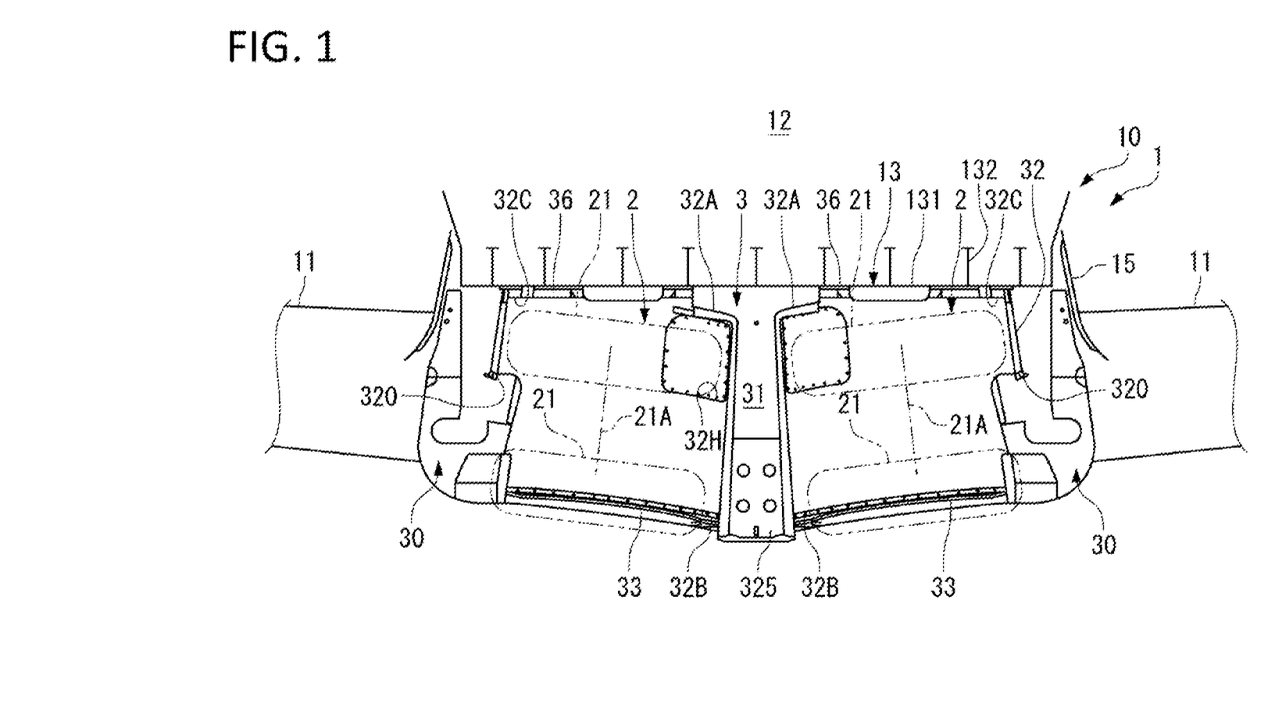
FIG. 1 is a sectional view of a main landing gear storage compartment of an aircraft according to an embodiment of the present invention as viewed from the front side.

As shown in FIG. 1, an aircraft 1 includes a fuselage 10, and main wings 11 that are provided on the left side and the right side of the fuselage 10.

The fuselage 10 is composed of a frame, a skin, a longeron, a stringer (all of which are not shown in the drawings), or the like.

The fuselage 10 includes various zones such as a flight deck, a cabin 12, a cargo compartment, and a storage bay 31 for a main landing gear.

A fairing (belly fairing) 15 that reduces aerodynamic drag is provided so as to cover the center of a lower portion of the fuselage 10. The fairing 15 (FIG. 2) is fixed to the outside of a skin 14.

In the following description, the terms "upper" and "lower" used for the configuration provided in the aircraft 1 mean "upper" and "lower" in a vertical direction when an airframe of the aircraft 1 is in a horizontal position.

The fuselage 10 includes a pair of right and left main landing gears 2 and 2 that are used when the aircraft 1 takes off and lands, or taxies on the ground, and a main landing gear storage compartment 3 that stores the main landing gears 2 and 2.

The main landing gears 2 and 2 and the main landing gear storage compartment 3 are configured symmetrically.

Figure 3:
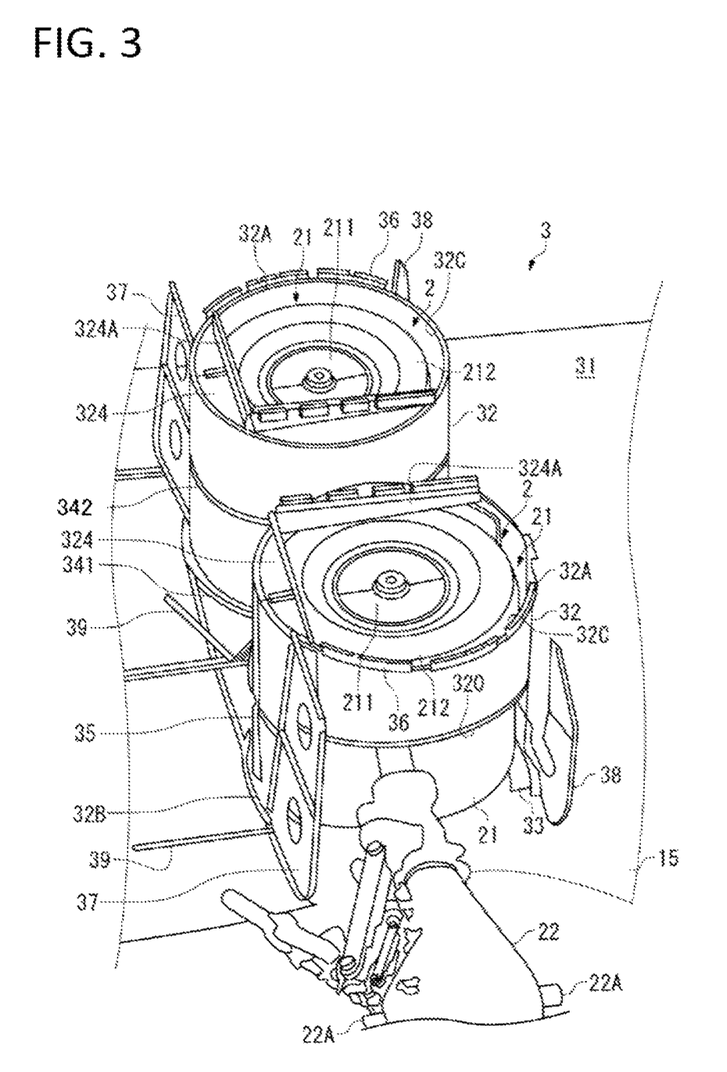
FIG. 3 is a perspective view illustrating wheel assemblies of main landing gears and shielding walls, in which a main landing gear and a shielding wall on the left side are shown on the near side of the drawing.

As shown in FIG. 3, each of the main landing gears 2 includes a wheel assembly 21, a shock-absorbing strut 22 that supports the wheel assembly 21, and absorbs a shock load generated in landing and a vibration load generated in taxiing, a steering system that changes the direction of the wheel assembly 21, and a braking system that stops the wheel assembly 21.

The main landing gear 2 includes two wheel assemblies 21 and 21 that are provided coaxially with each other (FIG. 1).

Each of the wheel assemblies 21 includes a metal wheel 211 that is provided on an axle 21A (FIG. 1) via a bearing, and a rubber tire 212 that is provided on the outer periphery of the wheel 211.

Air having a predetermined pressure, e.g., 1 MPa or more is sealed in the tire 212. A gas having a higher proportion of nitrogen than the air, or a pure nitrogen gas may be used in some cases.

The shock-absorbing strut 22 includes a cylinder, and a piston that compresses a working fluid and a nitrogen gas sealed in the cylinder. One side of the cylinder and the piston supports the axle 21A. The shock-absorbing strut 22 also includes a mechanism that raises and lowers the wheel assemblies 21 and the shock-absorbing strut 22.

The shock-absorbing strut 22 is provided with a shaft section 22A that is provided on a pivot section (not shown) fixed to a structural member of the fuselage 10. The shock-absorbing strut 22 is rotated about the shaft section 22A.

The main landing gear 2 is stored in the main landing gear storage compartment 3 in a state in which the axle 21A is erected, and the wheel assemblies 21 and the shock-absorbing strut 22 are laid down. When the main landing gear 2 is stored, the shock-absorbing strut 22 is arranged on the side apart from the axis longitudinally extending through the fuselage 10, and the wheel assemblies 21 are arranged on the side close to the axis.

When used, the main landing gear 2 is deployed into a state in which the axle 21A is horizontal and the wheel assemblies 21 and the shock-absorbing strut 22 are erected.

The main landing gear storage compartment 3 is a space formed such that the lower portion of the fuselage 10 is depressed as shown in FIG. 1. The cabin 12 is located above the main landing gear storage compartment 3.

The main landing gear storage compartment 3 includes two storage openings 30 so as to pull out the main landing gears 2 and 2 toward the ground, and pull in the main landing gears 2 and 2 into a storage state. The storage opening 30 located on the left side corresponds to the left-side main landing gear 2, and the storage opening 30 located on the right side corresponds to the right-side main landing gear 2.

Figure 2:
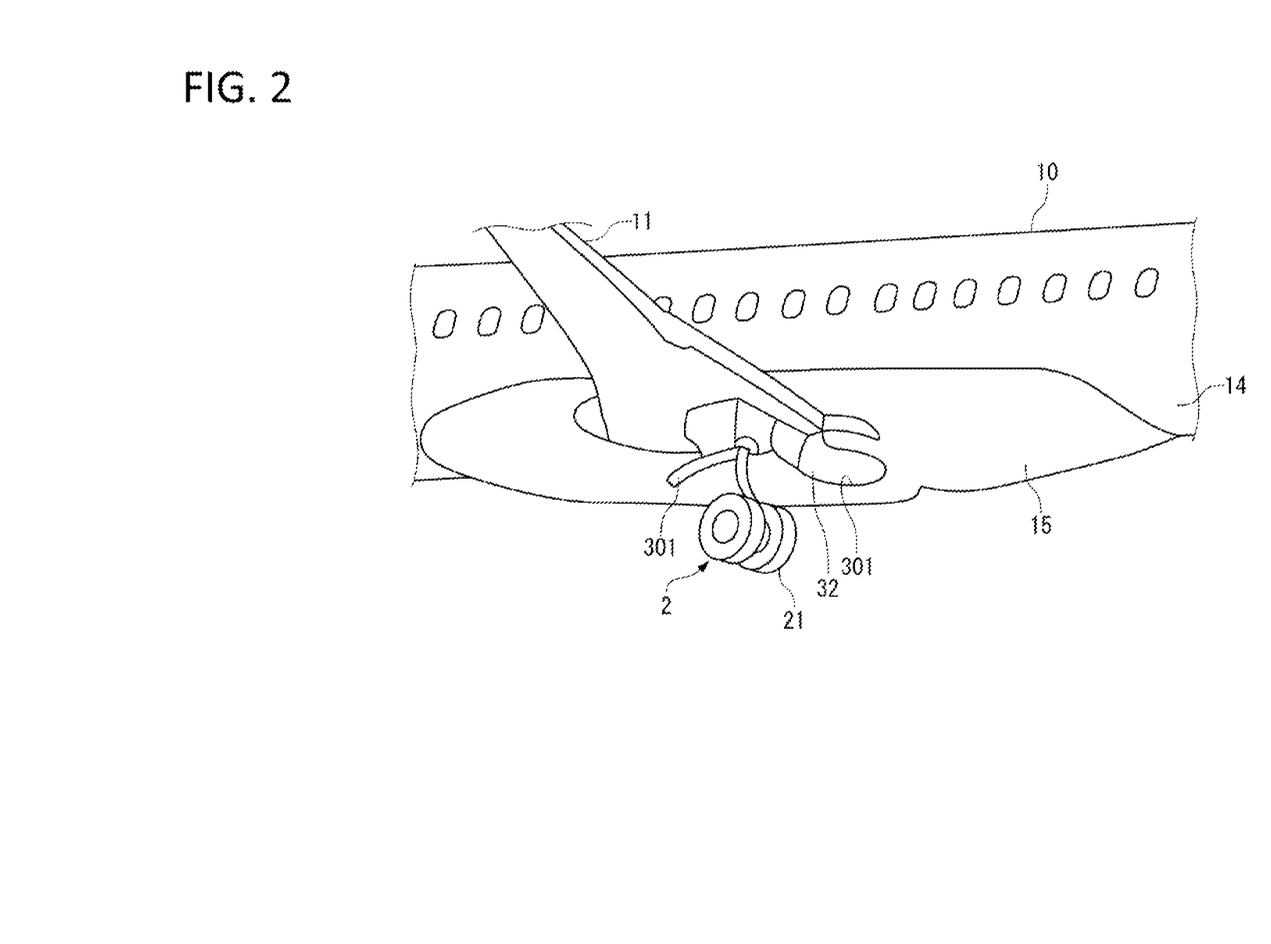
FIG. 2 is a perspective view illustrating a fuselage and a fairing of the aircraft.

As shown in FIG. 2, each of the storage openings 30 is formed across the fairing 15 provided on the fuselage 10, and the main wing 11. The fairing 15 formed in a curved plate-like shape includes a lower portion that is directed to the ground when the airframe is in a horizontal position with respect to the ground, and a side portion that is directed laterally when the airframe is in the horizontal position.

The storage opening 30 opens in a circular shape in the lower portion of the fairing 15 so as to allow the wheel assemblies 21 and 21 of the main landing gear 2 to enter and exit therethrough, and also opens from the fairing 15 to the root of the main wing 11 so as to allow rotation of the shock-absorbing strut 22.

The fairing 15 needs to have rigidity high enough to withstand an aerodynamic load. Therefore, the fairing 15 is supported on the skin by a plurality of support members.

A door 301 that is opened and closed when the main landing gear 2 is raised and lowered is provided at the storage opening 30. The door 301 is provided according to the need.

The main landing gear storage compartment 3 includes the storage bay 31 that stores the main landing gears 2, and in which various accessories (not shown) are installed around the main landing gears 2, and two shielding walls 32 that block jet blast from the tires 212 of the main landing gears 2, and dust etc. as shown in FIG. 1.

The storage bay 31 is separated from the cabin 12 by a partition wall 13. The storage bay 31 is a space located inside the fairing 15. The fairing 15 is also fixed to the partition wall 13.

While the inside of the cabin 12 is pressurized, the inside of the storage bay 31 is not pressurized. Therefore, a structural member that withstands a pressure difference between the inside of the cabin 12 and the inside of the storage bay 31, and provides the strength of the fuselage 10 is employed as the partition wall 13. The partition wall 13 includes a plate-like partition wall body 131 that is installed horizontally, and a rib 132 that reinforces the partition wall body 131 from the side of the cabin 12.

For example, a control system that operates a control surface, a main landing gear system that operates the main landing gears 2 or a main landing gear brake, a fuel system, a hydraulic system, and pipes and wires accompanying the systems are installed as the accessories within the storage bay 31. Accessories required to be protected from the jet blast and the dust etc. are not provided in a portion facing an upper opening 32C of the shielding wall 32 in the partition wall 13.

The shielding wall 32 is a cylindrical member, inside of which the wheel assemblies 21 and 21 of the main landing gear 2 are arranged. The shielding wall 32 located on the left side corresponds to the left-side main landing gear 2. The shielding wall 32 located on the right side corresponds to the right-side main landing gear 2.

Figure 4:
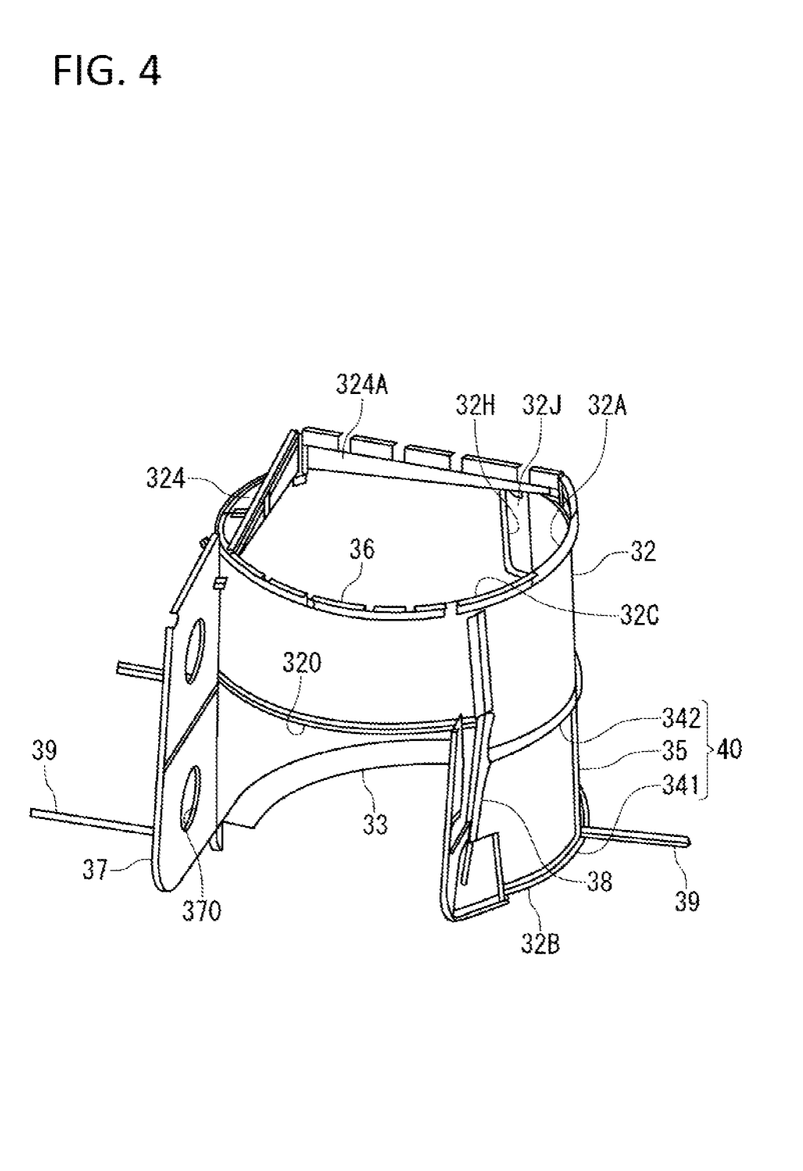
FIG. 4 is a perspective view illustrating the shielding wall.

As shown in FIG. 4, the lower side of the shielding wall 32 is opened so as to allow the wheel assembly 21 to enter and exit therethrough, and the upper side of the shielding wall 32 is also opened.

A strut opening 320, through which the shock-absorbing strut 22 is passed, is formed in a side surface of the shielding wall 32.

The strut opening 320 is formed by cutting out one circumferential portion of the shielding wall 32 in a substantially rectangular shape from the lower end to nearly half the height thereof. The size of the strut opening 320 is set according to a movable range of the shock-absorbing strut 22.

In the shielding wall 32, reinforcement members 37 and 38 are fixed to the both sides of the strut opening 320 by fasteners along the opposite sides of the strut opening 320. The periphery of the strut opening 320 in the shielding wall 32 is reinforced by the reinforcement members 37 and 38.

The reinforcement member 37 is a substantially rectangular plate-like member that rises in an off-plate direction from an outer peripheral surface of the shielding wall 32. A hole 370 is formed in the reinforcement member 37 so as to reduce the weight. The lower end of the reinforcement member 37 is fixed to the fairing 15 by a fastener.

The reinforcement member 38 is attached to a structural object held on the fuselage 10 through an opening portion.

The forms of the reinforcement members 37 and 38 are merely one example. The strut opening 320 can be composed of a reinforcement member of any form.

The shielding wall 32 is formed in a circular cylindrical shape having a slightly larger inner diameter than the outer diameter of the wheel assembly 21. More specifically, the shielding wall 32 has a shape having a double-curved surface.

Since the shielding wall 32 is slightly widened from an upper end 32A toward a lower end 32B, it is possible to reliably accommodate the wheel assemblies 21 and 21 inside the shielding wall 32 while avoiding interference of the wheel assemblies 21 and 21 pulled in from the lower end 32B, with the shielding wall 32.

A predetermined clearance is set between the inner periphery of the shielding wall 32 and the outer periphery of the wheel assembly 21 so as to leave a gap therebetween even when the tire 212 maximally expands due to a decrease in atmospheric pressure in the sky.

The shielding wall 32 is formed of a metal material, or a composite material. The composite material is fiber reinforced resin containing reinforcement fiber such as carbon fiber and glass fiber, and resin.

As the metal material, aluminum or aluminum alloy is preferably used in view of the weight, formability, and material cost.

While the shielding wall 32 may be fabricated by cutting, casting or the like from the metal material, the shielding wall 32 is preferably fabricated by roll forming, stretch forming, or bending such as press bending in view of the machining cost.

The circular-cylindrical shielding wall 32 of the present embodiment is formed from the metal material by roll forming or stretch forming. When the shielding wall 32 is formed in a square cylindrical shape having a square shape in cross section, a metal plate may be bent by pressing.

Figure 5:
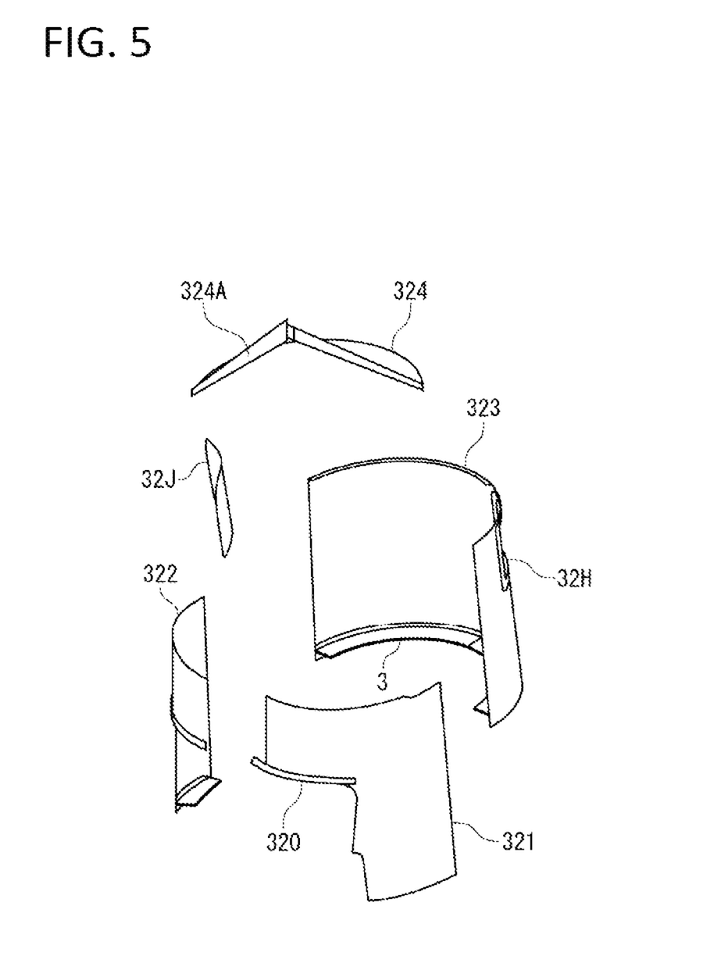
FIG. 5 is an exploded perspective view of the shielding wall.

The shielding wall 32 includes lateral panels 321 to 323, and an upper panel 324 as shown in FIG. 5. The panels 321 to 324 are preferably detachably coupled to each other by fasteners (not shown) so as to facilitate removal in maintenance.

Cutouts formed in the two lateral panels 321 and 322 adjacent to each other in a circumferential direction of the shielding wall 32 are aligned with each other to form the strut opening 320. The lateral panel 323 is arranged at a back surface of the strut opening 320. The shielding wall 32 is divided into the plurality of lateral panels 321 to 323 in the circumferential direction.

The upper panel 324 is formed along the upper ends of the lateral panels 322 and 323. A fixing piece 324A that rises upward is formed on the upper panel 324. The fixing piece 324A is formed in an L shape in plan view. Accessories not required to be protected from the jet blast and the dust etc. are arranged inside the fixing piece 324A.

If necessary, a maintenance hatch 32H is provided in one panel, i.e., the panel 323 out of the panels 321 to 324. The hatch 32H has an opening formed in the lateral panel 323, and a lid 32J that closes the opening. By removing the lid 32J fastened to the lateral panel 323, maintenance of accessories located outside the hatch 32H can be performed from inside the shielding wall 32.

Next, a structure around the lower opening of the shielding wall 32, and a structure around the upper opening of the shielding wall 32 are described.

As shown in FIG. 1, the lower end 32B of the shielding wall 32 is located at a position facing the storage opening 30 of the main landing gear storage compartment 3. The lower opening of the shielding wall 32 enclosed by the lower end 32B communicates with the storage opening 30.

A rubber member 33 projecting toward the inner periphery side is provided in an arc shape at the lower end 32B of the shielding wall 32 as shown in FIG. 4.

The rubber member 33 closes a gap between the outer periphery of the wheel assembly 21 and the inner periphery of the shielding wall 32. Accordingly, an increase in aerodynamic drag is avoided, and foreign matter is prevented from entering the inside of the shielding wall 32 during a flight.

The rubber member 33 is provided at substantially the same position as the surface of the wheel assembly 21 that is located at a lower position out of the wheel assemblies 21 and 21 inside the shielding wall 32 (FIG.

A brush may be also used instead of the rubber member 33. An arc-shaped brush, the bundles of bristles of which are radially aligned, may be provided at the lower end 32B of the shielding wall 32.

The upper opening 32C enclosed by the upper end 32A of the shielding wall 32 is covered with the partition wall 13 as shown in FIG. 1. The partition wall 13, which covers the entire upper opening 32C, also serves as a lid of the shielding wall 32.

The shielding wall 32 is arranged so as to be slightly inclined with respect to a direction perpendicular to the partition wall 13 (an upper-lower direction).

The partition wall 13 and the shielding wall 32 surround the wheel assembly 21 to block the jet blast from the wheel assembly 21, and the dust etc. The shielding wall 32 is formed to have a sufficient strength against the pressure of the jet blast. Of course, the partition wall 13 as the structural member providing the strength of the fuselage 10 has a sufficient strength against the pressure of the jet blast by the partition wall body 131 and the rib 132.

The thickness of the shielding wall 32 is determined according to the strength required for the shielding wall 32. The plate thickness of the shielding wall 32 is, for example, about several mm.

Among various cylindrical bodies having the same thickness and such a size as to tightly store the wheel assembly 21 therein, the circular-cylindrical shielding wall 32 having a circular shape in cross section has a smaller weight than any other cylindrical body including those having a square shape and a polygonal shape in cross section. Therefore, when the shielding wall 32 is formed in a circular cylindrical shape, the weight can be suppressed.

In the present embodiment, a gap is left between the partition wall 13 and the upper end 32A of the shielding wall 32. Since the accessories required to be protected from the jet blast and the dust etc. are arranged at a position apart from the gap, the accessories are not exposed to the jet blast and the dust etc.

Of course, it is more preferable that the partition wall 13 covers the upper opening 32C of the shielding wall 32 with no gap between the partition wall 13 and the upper end 32A of the shielding wall 32 since the jet blast and the dust etc. can be completely blocked.

Next, a structure of fixing the shielding wall 32 to the partition wall 13 is described.

A fixing section 36 is provided at the upper end 32A of the shielding wall 32. A fixing section is also correspondingly provided at the partition wall 13. The fixing section 36 of the shielding wall 32 and the fixing section of the partition wall 13 are permanently coupled together by riveting, welding or the like. When the shielding wall 32 is coupled to the fixing section 36 so as to be removable by a fastener, the shielding wall 32 is fixed to the partition wall 13.

The fixing section 36 is composed of a plurality of parts provided on the upper end 32A of the shielding wall 32. Some of the parts are provided on the upper end of the fixing piece 324A.

The respective parts of the fixing section 36 are formed in an L shape in section. The same applies to support rings 341 and 342, support struts 35, and support members 39 described below.

Next, a structure of supporting the fairing 15 by the shielding wall 32 is described.

The annular support rings 341 and 342 are provided on the outer periphery of the shielding wall 32. The support rings 341 and 342 are respectively arranged at the lower end 32B of the shielding wall 32, and between the lower end 32B and the upper end 32A, and are connected to each other by the vertically-extending support struts 35 at a plurality of circumferential positions.

The support ring 341 arranged at the lower end 32B of the shielding wall 32 is fixed to the fairing 15 by fasteners at a plurality of circumferential positions. Accordingly, the shielding wall 32 supports the fairing 15 via the support ring 341.

The shielding wall 32 is accommodated inside a frame (FIG. 4) that is formed by assembling the support rings 341 and 342, and the support struts 35 together by fasteners. A frame 40 for accommodating the left-side shielding wall 32 and a frame 40 for accommodating the right-side shielding wall 32 are connected by a connecting section 325 (FIG. 1) and a support member (not shown). The connecting section 325 is a plate-like member extending between the frames 40 and 40.

The shielding wall 32 is connected to the fairing 15 via the plurality of rod-like support members 39 fixed to the frame 40.

The support members 39 extend in the off-plate direction of the outer peripheral surface of the shielding wall 32. The positions on the outer peripheral surface of the shielding wall 32 and the extension directions of the plurality of support members 39 are determined so as to sufficiently support the shielding wall 32 against an external force in various directions.

The proximal ends of the support members 39 and the frame 40, and the distal ends of the support members 39 and the fairing 15 are respectively fixed by fasteners (not shown).

That is, the shielding wall 32 supports the fairing 15 via the support members 39 as well as the support ring 341.

The effects obtained by the configuration of the main landing gear storage compartment 3 of the present embodiment are described below.

Jet blast may occur in the tire 212 of the main landing gear 2 during the flight of the aircraft 1 due to a crack or the like formed in the tire 212, or a thermal effect from the overheated brake.

Figure 6:
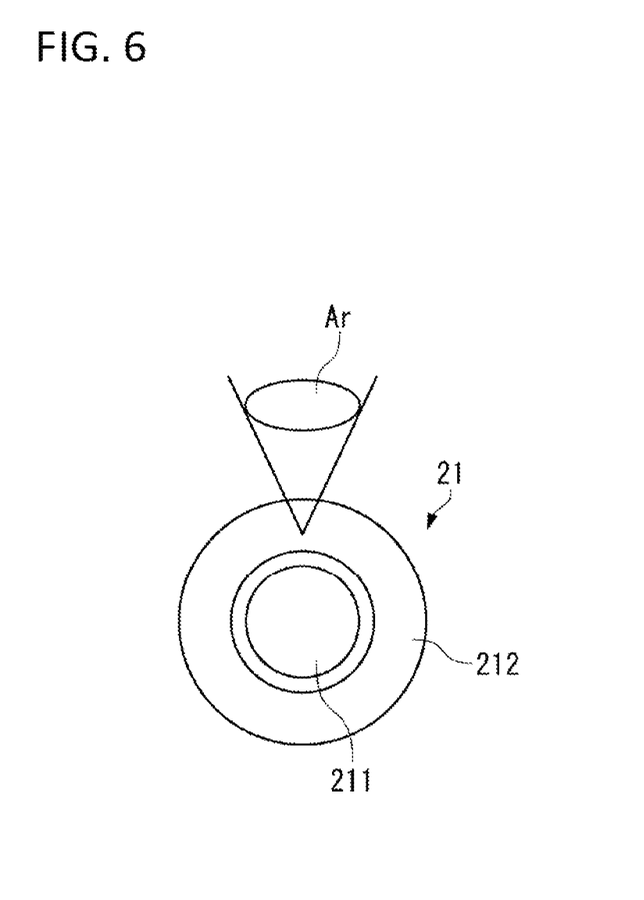
FIG. 6 is a schematic view illustrating a state in which air inside a tire of the wheel assembly is jetted.

The jet blast is a phenomenon in which air Ar sealed in the tire 212 is jetted in a conical shape as shown in FIG. 6. The jet blast generates a pressure according to a distance from a jet outlet.

In the present embodiment, the accessories are not provided in the portion facing the upper opening 32C of the shielding wall 32 in the partition wall 13, and the shielding wall 32 and the partition wall 13 surround the tire 212. The shielding wall 32 and the partition wall 13 receive the pressure of the jet blast. Accordingly, the jet blast is blocked from the outside of a space surrounded by the shielding wall 32 and the partition wall 13.

In the strut opening 320, the jet blast hits the shock-absorbing strut 22 to be blocked, so that the jet blast is sealed in the space surrounded by the shielding wall 32 and the partition wall 13.

Accordingly, the accessories arranged around the main landing gear 2 are protected from the pressure of the jet blast. Various accessories including those playing an important part in the flight can be thereby arranged within the storage bay 31.

The shielding wall 32 is deformed so as to swell toward the outside by the jet blast. Thus, the accessories are preferably installed slightly apart from the outer peripheral surface of the shielding wall 32.

During taxiing, the dust etc. kicked up by the tire 212 enters the inside of the main landing gear storage compartment. The dust etc. is also sealed in the space surrounded by the shielding wall 32 and the partition wall 13, and does not scatter to the outside in a similar manner to the aforementioned jet blast. Therefore, the dust etc. can be prevented from contaminating the accessories, and affecting the operations of the accessories.

The wheel assembly 21 may be inertially rotating when the main landing gear 2 is pulled in after takeoff. In this case, the dust etc. attached to the wheel assembly 21 is also prevented from scattering by the shielding wall 32 and the partition wall 13.

Here, since the main landing gear storage compartment 3 is configured by the shielding wall 32 and the partition wall 13, advantages in relation to the weight, cost, and forming process are obtained as described below.

If a configuration in which a dedicated lid portion for covering the upper opening 32C of the shielding wall 32 is provided, and the shielding wall 32 and the lid portion surround the wheel assembly 21 is employed, the weight of the lid portion is increased, thereby causing a cost increase.

Moreover, the lid portion is desired to have a bowl-like shape (a dome-like shape) so as to ensure the strength withstanding the jet blast while suppressing the weight. However, it is difficult to form the bowl-shaped lid portion. When a metal material is used, deep drawing is suitable for forming the bowl-like shape. However, a crack is easily generated in forming the lid portion, and the die cost is high.

In the present embodiment, the partition wall 13 facing the upper end 32A of the shielding wall 32 also serves as the lid portion of the shielding wall 32.

By using the existing partition wall 13, it is not necessary to prepare the lid portion, but only necessary to prepare the cylindrical shielding wall 32 that faces the outer periphery of the wheel assembly 21. Thus, the weight and the material cost can be suppressed.

Furthermore, the shielding wall 32 of the present embodiment is formed from the metal material by roll forming or stretch forming that is more excellent in productivity that deep drawing, cutting, casting or the like. Thus, the manufacturing cost can be suppressed. As compared to a case in which the shielding wall 32 is formed from the composite material, the material cost is low, and the process is simple, so that the productivity is more excellent. Thus, the manufacturing cost can be suppressed. Lightweight properties equivalent to the composite material can be further achieved by selecting aluminum or the like having a light weight as the metal material.

The metal material is more advantageous than the composite material in view of repairing the shielding wall 32 when damaged. When the composite material is used, a process and a time for performing vacuum drawing or thermal curing of a composite material patch are required. On the other hand, when the metal material is used, it is only necessary to simply fasten a metal patch.

Furthermore, in the present embodiment, the shielding wall 32 is connected to the fairing 15 by the support members 39 while providing the shielding wall 32 with a structural strength by fixing the shielding wall 32 to the partition wall 13. The shielding wall 32 thereby also functions to support the fairing 15. Accordingly, the shielding wall 32 partially constitutes a support structure of the fairing 15. Therefore, the number of support members supporting the fairing 15 on the skin or the partition wall 13 can be decreased, and the sectional area of the support member can be reduced. That is, the support member can be simplified and reduced in weight.

In accordance with the present embodiment, since the shielding wall 32 is composed of the plurality of panels 321 to 324, it is only necessary to remove one panel facing the accessories as an object of maintenance so as to perform maintenance of the accessories installed around the shielding wall 32 from inside the shielding wall 32. Each of the panels 321 to 324 has a weight easily held by a person, and can be thereby easily attached and detached. Thus, maintainability can be improved.

Although the aircraft 1 including the two main landing gears 2 is described in the above embodiment, the present invention may be also applied to an aircraft including three or more main landing gears. It goes without saying that the aforementioned structure of the main landing gear storage compartment 3 can be employed as the structure of a storage compartment for storing the respective main landing gears.

Any number of wheel assemblies 21 may be provided on one main landing gear 2.

Moreover, if the main wing 11 has a thickness large enough to store the main landing gear, the main landing gear storage compartment may be provided, not in the fuselage 10, but in the main wing 11.

The present invention may be also applied to the structure of a storage compartment for another landing gear provided in an aircraft, such as a nose landing gear of the aircraft 1. Accessories installed around the landing gear in the storage compartment are protected from the jet blast and the dust etc. by installing a shielding wall, inside of which a wheel assembly of the landing gear is arranged, and covering an upper opening of the shielding wall with a member.

Although the panels of the shielding wall or the support members provided in the landing gear storage compartment of the present invention are preferably detachably fixed by fasteners so as to improve the maintainability, the present invention allows the use of another method, for example, welding so as to fix the panels or the support members.

The present invention also allows that the shielding wall 32 as a wall body, inside of which the wheel assembly of the landing gear is arranged, also serves as a casing of the accessories.

The constitutions described in the embodiment described above may be also freely selected or changed into other constitutions without departing from the scope of the present invention.

What is claimed is:

1. A landing gear storage compartment of an aircraft comprising:
   a storage bay that stores a landing gear for use in takeoff and landing;
   a partition member that separates the storage bay from an upper zone located above the storage bay; and
   a wall body fixed within the storage bay, that has an open portion at an upper side, inside of which a wheel of the landing gear stored in the storage bay is arranged, and whose lower side through which the wheel enters and exits is open,
   wherein the wall body and partition member are separate components and the open portion of the wall body is covered with the partition member, and
   wherein the wall body has a cylindrical shape and includes a strut opening through which a strut that supports the wheel assembly is passed, wherein the cylindrical shape of the wall body surrounds the periphery of the wheel.

2. The landing gear storage compartment of an aircraft according to claim 1, wherein the wall body has a circular cylindrical shape and is formed from a metal material by roll forming or stretch forming.

3. The landing gear storage compartment of an aircraft according claim 1, wherein the wall body is fixed to the partition member that separates the upper zone and the storage bay, further wherein the wall body is fixed to a fairing to thereby support the fairing, wherein the fairing is located around the lower opening of the wall body and reduces aerodynamic drag of an airframe of the aircraft.

4. The landing gear storage compartment of an aircraft according claim 1, wherein the wall body includes a plurality of panels that are detachably coupled to each other.

5. An aircraft comprising the landing gear storage compartment according to claim 1.

6. The landing gear storage compartment of an aircraft according to claim 1, wherein the wall body comprises a shielding wall configured to block jet blast from the wheel.

* * * * *

UNITED STATES PATENT AND TRADEMARK OFFICE
CERTIFICATE OF CORRECTION

| | | |
|---|---|---|
| PATENT NO. | : 9,499,256 B2 | Page 1 of 1 |
| APPLICATION NO. | : 14/322217 | |
| DATED | : November 22, 2016 | |
| INVENTOR(S) | : Keiji Nakashima et al. | |

It is certified that error appears in the above-identified patent and that said Letters Patent is hereby corrected as shown below:

In the Specification

Column 6, Line 49, "and 21 inside the shielding wall 32 (FIG." should read --and 21 inside the shielding wall 32 (FIG. 1)--.

Column 7, Line 60, "(FIG.4) that is formed by assembling the support rings 341" should read --40 (FIG. 4) that is formed by assembling the support rings 341--.

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*